United States Patent

[11] 3,548,120

[72] Inventor Alexandre Tarassoff
Paris, France
[21] Appl. No. 717,824
[22] Filed April 1, 1968
[45] Patented Dec. 15, 1970
[73] Assignee Telecommunications Radioelectriques & Telephoniques T. R. T.
Paris, France
[32] Priority March 31, 1967
[33] France
[31] No. 100939

[54] TRANSMISSION LINE REPEATER STATION FOR TWO SIGNALS TRAVELLING IN OPPOSITE DIRECTIONS
3 Claims, 4 Drawing Figs.

[52] U.S. Cl. .......... 179/170.4
[51] Int. Cl. .......... H04b 3/22
[50] Field of Search .......... 179/170.4, 170A

[56] References Cited
UNITED STATES PATENTS

| | | | |
|---|---|---|---|
| 2,300,415 | 11/1942 | Green .......... | 179/170(A) |
| 2,382,588 | 8/1945 | Thornton et al. .......... | 179/170.4 |
| 3,106,679 | 10/1963 | Friedrich .......... | 179/170.4 |

*Primary Examiner*—Kathleen H. Claffy
*Assistant Examiner*—William A. Helvestine
*Attorney*—Frank R. Trifari

ABSTRACT: A repeater stage for amplification of carrier modulated oscillations of two frequency bands in opposite directions has a common amplifier, attenuator and equalizer for oscillations of both bands. Pilot oscillations in one band are employed to control the attenuator, and pilot oscillations in the other band are employed to control the equalizer.

INVENTOR.
ALEXANDRE TARASSOFF
BY
AGENT

TRANSMISSION LINE REPEATER STATION FOR TWO SIGNALS TRAVELLING IN OPPOSITE DIRECTIONS

The invention relates to a transmission system for the transmission of carrier-modulated signals between two terminal stations, through a transmission line, which terminal stations transmit carrier-modulated signals located in separate frequency bands, at least one intermediate repeater being included in the transmission line for amplification of the two frequency bands in both traffic directions. This system is particularly usable for carrier telephony transmission.

The two bands are separated from each other in a conventional manner in the intermediate repeater by means of a separating filter and each of these bands is amplified in a separate amplifier.

To improve the transmission quality in case of variation of the transmission characteristic of the transmission line, for example, due to temperature variations, climatological influences etc., it is common practice in such an intermediate repeater to compensate for the frequency-dependant transmission characteristic of the transmission line. The relevant variations in the transmission characteristic are not negligible, particularly not in case of overhead lines.

For this purpose each terminal station transmits in a conventional manner two pilot signals in the transmitted frequency band, which pilot signals are mostly located at the end of the frequency bands and are selected in the intermediate repeater for each traffic direction and utilized for control of the transmission characteristic. More particularly, one of the pilot signals is utilized in each traffic direction for attenuation control at a point of the relevant transmission band and the other pilot signal is utilized for control of the slope of the transmission characteristic of the relevant transmission band.

An object of the invention is to provide a considerable simplification in such a transmission system while maintaining the same accuracy of control of the transmission characteristic.

The transmission system according to the invention is characterized in that each terminal repeater station in the transmission band cotransmits a single pilot signal in the relevant direction of transmission, said two pilot signals jointly controlling the intermediate repeater which is designed as a common repeater for the two frequency bands in both traffic directions.

In order that the invention may be readily carried into effect it will now be described in detail, by way of example, with reference to the accompanying diagrammatic drawing, in which:

FIG. 3 shows an intermediate repeater in a carrier telephony transmission system according to the invention, while FIG. 4 shows the carrier telephony line.

Figure 1:
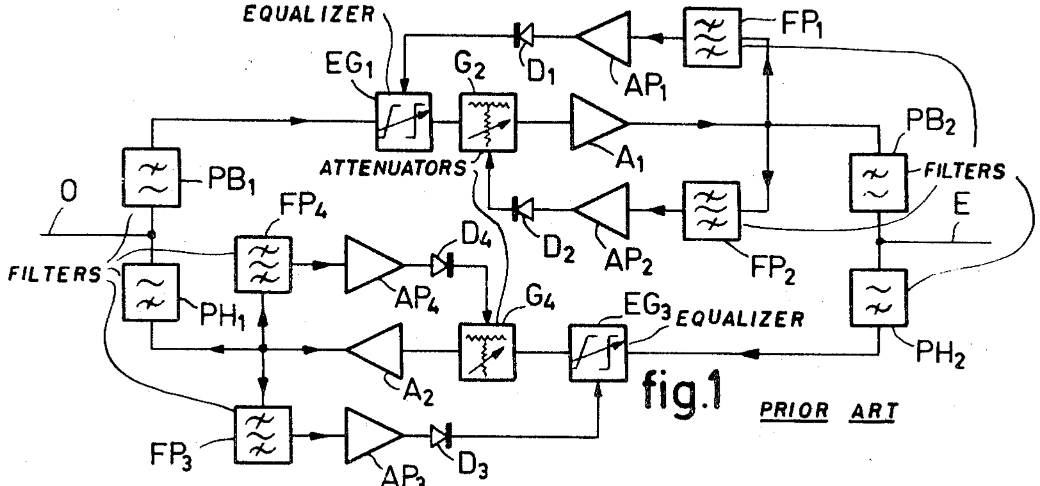
fig.1 PRIOR ART
FIG. 1 shows an embodiment of a known intermediate repeater which is controlled in each traffic direction by two pilot signals for automatic control of the transmission characteristic.

In the arrangement shown in FIG. 1, the terminal station 0 (at the left of the FIG.) transmits the frequency band located between the frequencies $f_1$ and $f_2$ and the terminal station E (at the right of the FIG.) a frequency band located between the frequencies $f_3$ and $f_4$, in which for the frequencies $f_1, f_2, f_3, f_4$ we have $f_1 < f_2 < f_3 < f_4$.

Two pilot signals $F_1$ and $F_2$ are transmitted in the frequency band between the frequencies $f_1$ and $f_2$, which signals are, for example, located at the ends of said frequency band, while in a similar manner the frequency band between the frequencies $f_3$ and $f_4$ includes two pilot signals $F_3$ and $F_4$ which are located at the ends of the said band.

The frequency band between $f_1$ and $f_2$ accompanied by the pilot signals $F_1$ and $F_2$ transmitted by the terminal station 0 passes through the low-pass filter $PB_1$, equalizer $EG_1$, attenuator $G_2$ and is transmitted after amplification in an amplifier $A_1$ through a low-pass filter $PB_2$ to the terminal station E.

The two pilot signals $F_1$ and $F_2$ are selected by selection filters $FP_1$ $FP_2$ at the output of the amplifier $A_1$ and after amplification in the pilot amplifiers $AP_1$ and $AP_2$ are rectified in rectifiers $D_1$ and $D_2$.

The control signal obtained by rectification of the pilot signal $F_2$ controls the adjustable attenuation $G_2$ in such manner that the pilot signal $F_2$ at the output of the amplifier $A_1$ is brought to the level at which it is transmitted by the terminal station O.

The control signal obtained by rectification of the pilot signal $F_1$ controls the adjustable equalizer EG in such manner that such an attenuation frequency characteristic arises that the level of the pilot signal at the output of the amplifier $A_1$ is equal to that of the pilot signal $F_2$.

In this manner the transmission characteristic for the relevant frequency band of the transmission line between the intermediate repeater and the terminal station O is corrected at any instant by the adjustable equalizer EG1 and the adjustable attenuator $G_2$.

For the other direction of transmission the pilot signals $F_3$ and $F_4$ play the same part in the control of the adjustable equalizer EG3 and the adjustable attenuation network G4 for correction of the transmission characteristic of the transmission line between the intermediate repeater and the terminal station E.

Thus the pilot signals $F_3$ and $F_4$ are found at the output of the amplifier $A_2$ in identical manner as described hereinbefore, the first pilot signal $F_3$ controlling the equalizer EG3 through the selection filter FP3, the amplifier AP3 and the rectifier D3 and the second pilot signal $F_4$ controlling the attenuator G 4 through the selection filter FP4, the amplifier AP4 and the rectifier D4.

The remaining intermediate repeaters in the transmission line are designed in identical manner.

Figure 2:
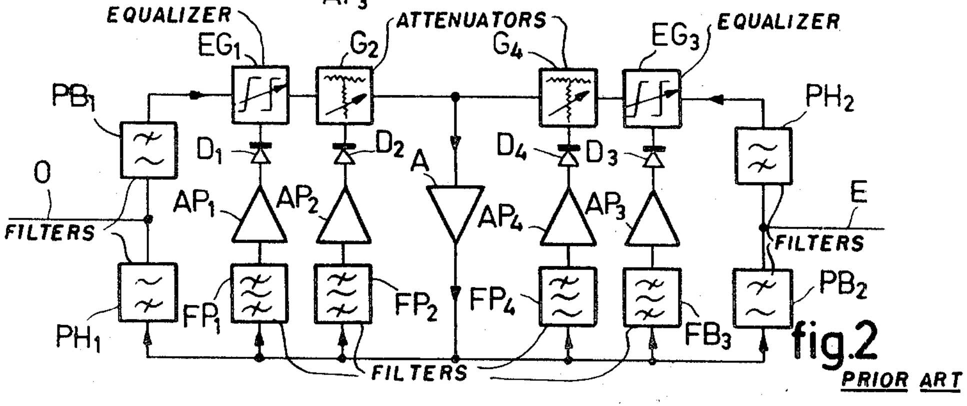
fig.2 PRIOR ART
FIG. 2 shows a further known intermediate repeater of the kind shown in FIG. 1.

Identical or analogous elements are used in the embodiment of FIG. 2 and corresponding elements have the same symbols but the assembly functions in a slightly different manner; more particularly in the diagram of FIG. 2 the signals for both traffic directions are amplified by a common amplifier A. To attain this object, the mutual position of the filters PH2 and PB2 must be exchanged relative to that of FIG. 1.

An object of the invention is to simplify the described system by transmitting a single pilot signal from each terminal station, thus a total of two pilot signals instead of four. In the relevant case the pilot signal $F_1$ is transmitted in the band $f_1—f_2$ and the pilot signal $F_4$ is transmitted in the band $f_3—f_4$.

Figures 3, 4:
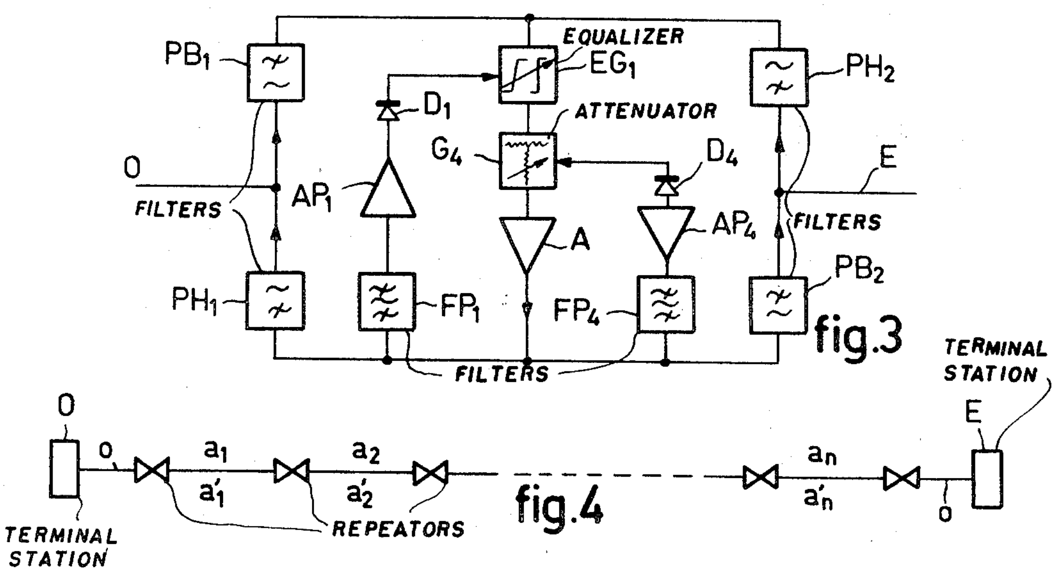

The intermediate repeater may advantageously be designed in the manner as illustrated in FIG. 3, in which corresponding elements have the same symbols as those in FIGS. 1 and 2.

In the arrangement of FIG. 3 the signal transmitted by the terminal station O and located in the band of $f_1—f_2$ including the pilot signal $F_1$ is passed by the low-pass filter $PB_1$ and blocked by the high-pass filter $PH_2$ and passes successively the adjustable equalizer $EG_1$ and the adjustable attenuator $G_4$ to be amplified by the amplifier A. The amplified signals are transmitted towards the terminal station E through the low-pass filter $PB_2$.

The terminal station E transmits the signals in the band of $f_3$-$—f_4$ including the pilot signal $F_4$ which signals are applied to the amplifier A through the high-pass filter $PH_2$, the adjustable equalizer $EG_1$ and the adjustable attenuator $G_4$. The amplified pilot signal $F_4$ which is transmitted to the terminal station O through the high-pass filter $PH_1$ occurs at the output of the amplifier A.

The two pilot signals $F_1$ and $F_4$ originating from the terminal stations E and O occur at the output of the amplifier A. After selection in the selection filters $FP_1$ and $FP_4$, these pilot signals are amplified in the amplifiers $AP_1$ and $AP_4$ and rectified by the rectifiers $D_1$ and $D_4$.

The control signal obtained by rectification of the pilot signal $F_4$ controls the adjustable attenuator $G_4$ to bring the output level $F_4$ of the amplifier A to the transmitting level, while the control signal obtained by rectification of the pilot signal $F_1$ controls the adjustable equalizer EG1 to bring the output level of the amplifier A at the frequency F1 to the output level at the frequency $F_4$.

The assembly comprising the equalizer $EG_1$, the attenuator $G_4$ and the amplifier A then shows an amplification characteristic which is equal to the attenuation at the frequency $F_1$ of the line on the side of the terminal station O and the attenuation at the frequency $F_4$ of the line on the side of the terminal station E.

If $n$ intermediate repeaters are provided between the terminal stations O and E it is possible, by going from O to E, to indicate the attenuations of the line sections at the frequency $F_1$ by $a_1, a_2.....a_n$ and the attenuations of the same line sections at the frequency $F_4$ by $a_1', a_2',.....a_n'$.

Assuming an average frequency of $\frac{f_1+f_4}{2}$ to propagate from O to E, then this frequency will successively pass through intermediate repeaters having amplifications of:

$$\frac{0+a_1'}{2}\ \frac{a_1+a2'}{2}\ \ldots,\ \frac{a_n+0}{2}$$

For this average frequency the total number of intermediate repeaters will then have an amplification of:

$$\frac{0+a_1'}{2}+\frac{a_1+a_2'}{2}+\cdots+\frac{a_{n1}+a_n'}{2}+\frac{a_n+0}{2}$$

$$=\frac{a_1+a_1'}{2}+\frac{a_n+a_n'}{2}$$

The total number of intermediate repeaters then corrects the sum of the attenuations of the line sections for the frequency $\frac{f_1+f_4}{2}$ For explanatory purposes, it has been assumed hereinbefore that the transmission characteristics of the line and of the equalizing networks vary linearly with the frequency.

This shows that only two pilot signals are required for the control of the transmission characteristic for the transmission of signals in both traffic directions.

I claim:

1. An intermediate repeater station for a transmission system for the transmission of carrier oscillations of the type having first and second terminal stations interconnected by a transmission path, wherein said path includes an intermediate repeater station having first and second terminals connected to said path on the sides of said repeater station toward said first and second terminal stations respectively, and wherein said first and second terminal stations apply carrier modulated oscillations in first and second separate frequency bands respectively and first and second pilot oscillations respectively in said first and second bands respectively to said path, whereby said repeater station amplifies oscillations in said first and second bands in opposite directions with respect to said path; said repeater station comprising amplifier means, filter means connected to apply oscillations of said first and second bands to said second and first terminals respectively, variable equalizing means, variable attenuator means, filter means for applying oscillations of said first and second bands from said first and second terminals respectively to the input of said amplifier means by way of said equalizer means and attenuator means, filter means for producing first and second control voltages responsive to the amplitudes of said first and second pilot oscillations respectively at the output of said amplifier means, and means applying said first and second control voltages to said equalizer and attenuator means respectively for controlling their transmission characteristics.

2. A repeater station as claimed in claim 1 wherein said first recited filter means are coupled to the output of said amplifier.

3. A repeater station as claimed in claim 1 wherein said third recited filter means each further comprises a serial connection of an amplifier and a rectifier.